March 27, 1934.　　　　L. HILT　　　　1,952,672
CULINARY UNIT
Filed May 28, 1932　　　　2 Sheets-Sheet 2
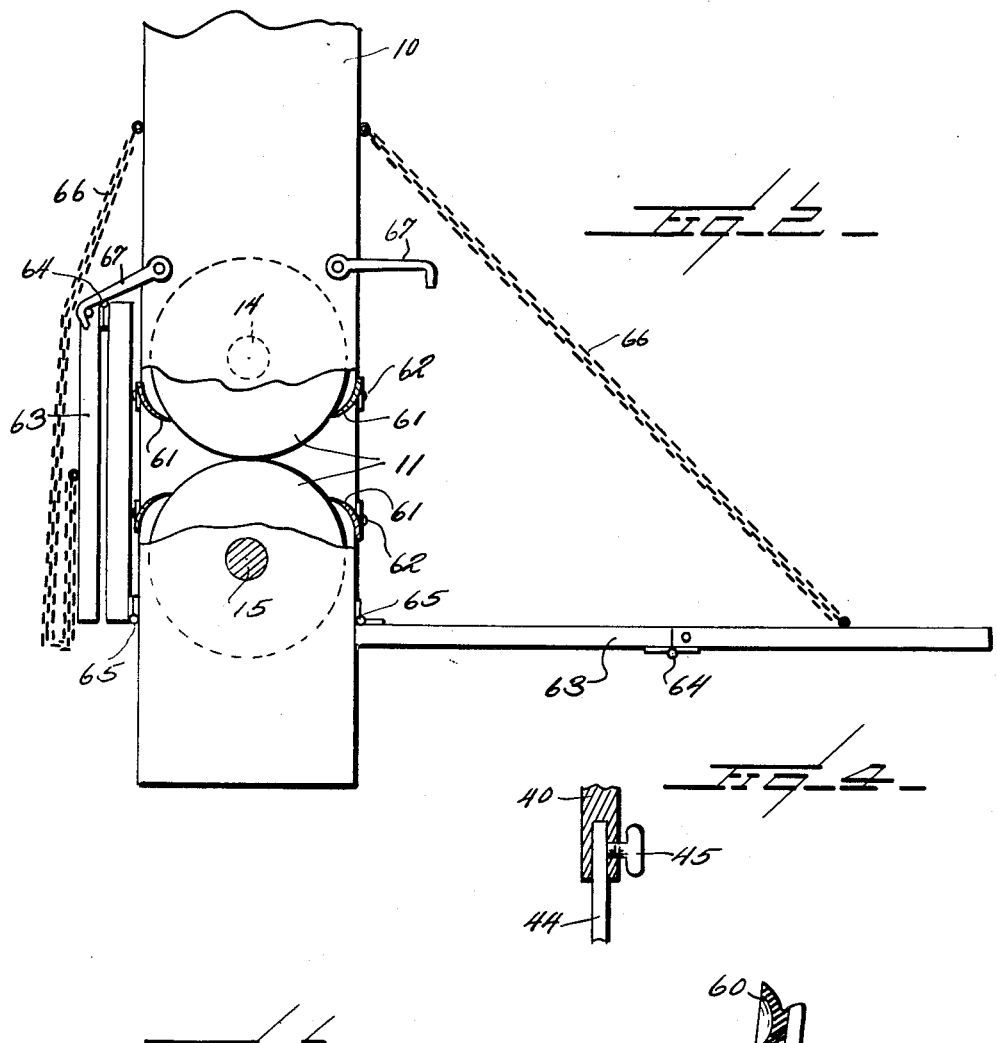

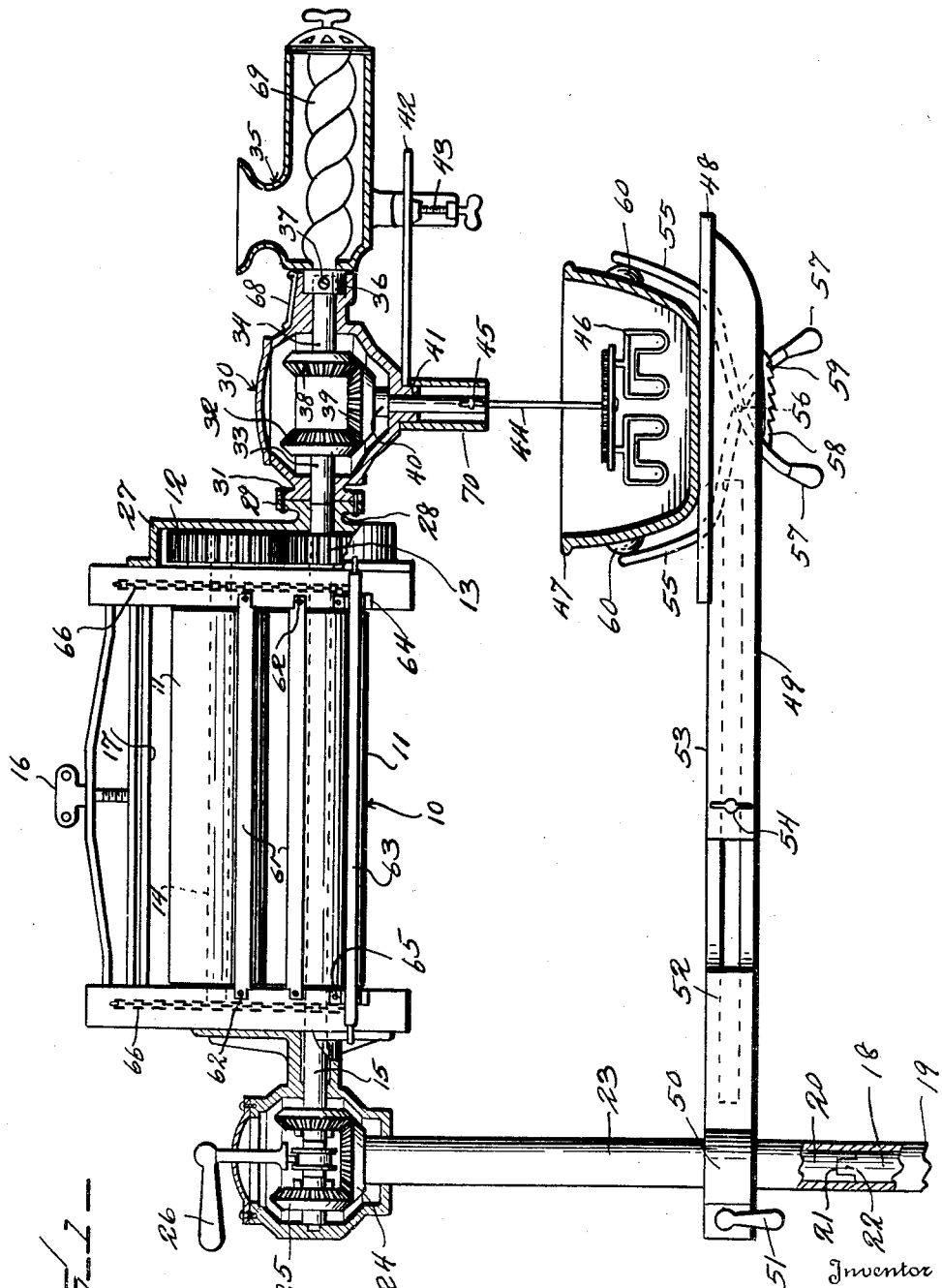

Patented Mar. 27, 1934

1,952,672

UNITED STATES PATENT OFFICE 1,952,672

CULINARY UNIT

Lewis Hilt, Palmerton, Pa.

Application May 28, 1932, Serial No. 614,146

4 Claims. (Cl. 259—1)

This invention relates to culinary devices and more particularly to a combination device for use in a kitchen or the like.

An object of this invention is to provide an attachment which can be mounted on any of the present types of washing machines having powered wringers so that dough and other articles can be prepared under the power of the washing machine motor.

Another object of this invention is to provide a device of this kind with detachable elements so that any one or all of these devices may be used.

A further object of this invention is to provide in a device of this kind means for supporting a receptacle in a position where the contents of the receptacle can be engaged by implements carried by the attachment.

The above and various other objects and advantages of this invention will in part be described and in part be understood from the following detailed description of the present preferred embodiment, the same being illustrated in the accompanying drawings wherein:—

Figure 1 is a detail side elevation partly in section of a device constructed in accordance with the preferred embodiment of this invention.

Figure 2 is an enlarged fragmentary end elevation partly broken away and partly in section of the dough rollers.

Figure 3 is an enlarged fragmentary side elevation partly broken away of the connection between two of the shaft sections.

Figure 4 is a fragmentary vertical section partly in detail showing the connection between the beater and the second driven shaft.

Figure 5 is a fragmentary sectional view partly in detail showing the suction cup for holding the receptacle on the platform.

Referring to the drawings wherein like numerals of reference designate corresponding parts throughout the several views, the numeral 10 designates generally the frame of a wringer provided with rollers 11 which have gears 12 and 13 mounted on shafts 14 and 15 respectively. This wringer construction is conventional and the rollers 11 are tightened by means of a screw 16 engaging a bar 17 within the frame structure 10. The wringer 10 is connected to a drive shaft 18 which is operatively engaged with a washing machine or other powered means, and this drive shaft 18 is rotatable in a sleeve 19. A drive shaft extension 20 is provided at the lower end thereof with a slot 21 for engagement with a tongue 22 carried by the drive shaft 18, and this extension 20 is journaled in a sleeve 23.

A gear box 24 is mounted on the upper end of the sleeve 23 and a gear mechanism, generally designated as 25, is mounted within this gear box and controlled by means of a clutch operating handle 26. This gear construction is conventional and further description thereof is believed unnecessary.

The shaft 15 of the wringer 10 is connected to the shaft 14 and constitutes the drive shaft for the wringer 10. The side of the wringer 10 opposite from the gears 25 is provided with a gear housing 27 disposed about the gears 12 and 13, and this housing 27, which is secured to one side of the wringer 10, is provided with a bearing 28 having a flange 29 engaged by a second gear housing 30 having a flanged inner end portion 31 which is secured to the flange 29 by means of bolts or other securing elements. This gear housing 30 encloses a driving gear 32 mounted on a shaft 33 which is splined to the outer end of the driving shaft 15 so that when the gear housing 30 is uncoupled from the housing 27, the shaft 15 will be uncoupled from the shaft 33.

A second stub shaft 34 is journaled in the housing 30 and a meat grinder, generally designated as 35, has a bushing or coupler 36 which is releasably secured to the stub shaft 34 by means of a screw or bolt 37 or the like. This stub shaft 34 has a gear 38 secured thereto, and this gear meshes with an intermediate beveled gear 39 which is carried by a shaft 40 which is journaled in a bearing 41 disposed in substantially vertical position beneath the two shafts 33 and 34.

Through the provision of this intermediate gear 39, the stub shaft 34 rotates in a direction reverse to the shaft 33. A supporting arm 42 is mounted on the housing 30 and extends in a direction toward the meat grinder 35 and the housing of the grinder 35 is clamped onto this supporting arm by means of a clamp structure 43.

The intermediate shaft 40 is provided with a bore at the lower end thereof within which a stem 44 is detachably mounted by means of a thumb screw 45 or the like. This stem 44 is adapted to carry beaters 46 which are disposed in a receptacle 47 which is mounted on a table or platform 48. This platform 48 is supported on an extensible arm 49 provided with a clamping or sleeve engaging portion 50 secured to the vertical sleeve 23 and held thereabout by means of a screw 51.

The supporting arm 49 comprises an inner bifurcated arm 52 which is engaged by an outer arm 53, and this outer arm 53 is held in adjusted position on the inner arm 52 by means of a thumb screw 54. The receptacle 47 is firmly held on the platform 48 by means of a pair of crossed clamping arms 55 which are pivoted to the outer end of the support 49, as at 56, and these arms 55 have levers 57 formed therewith so that the arms 55 may be readily moved relative to each other.

A toothed bar 58 is carried by one of the arms 55 and engages a pin or abutment 59 carried by the opposing arm or handle 57. The upper ends of the arms 55 have suction cups 60 mounted thereon for engagement with the outer surface of the bowl or receptacle 47.

When these arms 55 are moved toward each other, the suction cups 60 will be compressed against the outer surface of the receptacle and the receptacle thereby held against movement either circumferentially or vertically on the platform 48.

The wringer structure 10 provides means for kneading or preparing dough and in order to prevent the dough from wrapping around the wringer rollers 11, I have provided guard members 61 disposed one on each side of the rollers 11 and secured by means of screws 62 to the frame of the wringer 10.

The wringer 10 is also provided on each side with a shelf 63 which is split in substantially the center thereof and the two sections hinged, as at 64, so that the shelf can be readily folded against the side of the wringer frame. The inner end of the shelf 63 is hinged, as at 65, to the side of the frame, and a flexible member 66 is secured at one end to the frame and at the opposite end to the shelf so as to hold the shelf in substantially horizontal operative position.

A hook 67 is pivotally secured to the frame of the wringer 10 and is adapted to engage the shelf 63 when in folded inoperative position so as to hold the shelf in its folded position. The housing 30 is also provided with a removable plate 68 which is disposed in a position to expose the securing member 37 of the meat grinder element 69 so that the meat grinder can be readily uncoupled from the remaining portion of the unit.

In order to protect the operator of the device from engagement with the thumb screw 45, a sleeve 70 is removably engaged with the bearing 41 and is loosely disposed about the extended portion of the shaft 40 and loosely engages about the thumb screw 45 so as to permit free rotation of the shaft 40.

In the use and operation of this device, the unit comprising the wringer 10, the grinder 35, and the beater 46, may be connected through the medium of the drive shaft 20 to a desired power means such as a washing machine or the like, and the rotation of the shaft 15 in either forward or reverse direction is controlled by the clutch lever 26 engaging the gear mechanism 25.

When it is desired to use the beater 46, the beater may be coupled to the beater shaft 40 by tightening the thumb screw 45 and the support 49 adjusted vertically on the sleeve 23 by the clamping means 50 so that the receptacle 47 will be positioned for engagement of the contents thereof by the beater 46. The receptacle clamping arms 55 may be engaged with the outer surface of the receptacle so as to hold the receptacle against movement and the clutch 26 then moved into the desired position to effect rotation of the shaft 15 and through the gears 32 and 39 to effect rotation of the shaft 40.

In the event it is desired to use the meat grinder and to catch the material discharged from the grinder, the platform 48 may be moved outwardly to a position where it will be disposed beneath the discharge end of the grinder 35 and the platform 48 adjusted vertically to the desired point beneath the grinder 35.

It will be noted from the foregoing that an exceedingly simple and compact unit has been devised which can be coupled to any desired power mechanism and which requires only a relatively small amount of space.

While I have shown a meat grinder 35 on stub shaft 34, this element is only diagrammatic as other elements such as a coffee grinder, bread crumber, or other grinding or cutting elements may be mounted on stub shaft 34 and in the same manner the beater element 46 is only diagrammatic and other elements such as ice cream freezing, stirring, or like elements may be attached to the stub shaft 40.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An attachment for a washing machine comprising a drive shaft, a dough rolling means carried by the shaft, a gear box connected to the dough rolling means and to the drive shaft, a food article grinding means connected to the gear box and disposed in substantial alinement with the shaft, a food article beating means connected to the gear box and disposed at substantially right angles to the shaft, and means for supporting a receptacle beneath the beating means.

2. An attachment for a washing machine comprising a sleeve, a drive shaft within the sleeve, a gear housing secured to the sleeve, gears within the housing and connected to the drive shaft, a dough rolling means connected to the gears, said dough rolling means comprising a frame, a pair of rollers within the frame, means engaging the rollers between the axial centers thereof to prevent winding of the material about the rollers, and a shelf swingably carried on each side of the frame.

3. An attachment for a washing machine comprising a vertically disposed drive shaft, a driven shaft operatively connected to the drive shaft and disposed at substantially right angles thereto, a second driven shaft operatively connected with the first driven shaft, a beater, means for removably securing the beater to the second driven shaft, a receptacle platform disposed below the beater, a sleeve engaging about the drive shaft, and means engaging the sleeve and the receptacle platform to support the platform in adjusted position relative to the beater.

4. An attachment for a washing machine comprising a drive shaft, a driven shaft operatively connected to the drive shaft and disposed at substantially right angles to the drive shaft, a second driven shaft, means for operatively connecting the second driven shaft to the first driven shaft whereby to dispose the second driven shaft in substantially parallel relation to the drive shaft, a sleeve about the drive shaft, article beating means connected to the second driven shaft, a receptacle platform, a supporting arm for the platform, means for adjustably clamping the arm about the sleeve whereby to dispose the platform in adjusted position relative to the beater, and clamping means carried by the platform to hold a receptacle in fixed position on the platform.

LEWIS HILT.